United States Patent
Yoshida et al.

(10) Patent No.: US 6,748,418 B1
(45) Date of Patent: Jun. 8, 2004

(54) TECHNIQUE FOR PERMITTING COLLABORATION BETWEEN WEB BROWSERS AND ADDING CONTENT TO HTTP MESSAGES BOUND FOR WEB BROWSERS

(75) Inventors: Yoichi Yoshida, Machida (JP); Jun Kaneta, Sagamihara (JP); Koichi Takahashi, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 09/595,134

(22) Filed: Jun. 16, 2000

(30) Foreign Application Priority Data

Jun. 18, 1999 (JP) .......................................... 11-173176

(51) Int. Cl.[7] .............................................. G06F 13/00
(52) U.S. Cl. ........................ 709/204; 709/203; 709/217
(58) Field of Search ................................ 709/200, 201, 709/203, 204, 217, 218, 219, 220, 221, 223, 224

(56) References Cited

U.S. PATENT DOCUMENTS

| | | | |
|---|---|---|---|
| 5,960,403 A | * | 9/1999 | Brown |
| 6,101,486 A | * | 8/2000 | Roberts et al. |
| 6,389,464 B1 | * | 5/2002 | Krishnamurthy et al. |
| 6,449,604 B1 | * | 9/2002 | Hansen et al. |
| 6,490,601 B1 | * | 12/2002 | Markus et al. |

FOREIGN PATENT DOCUMENTS

GB 2330429 4/1999

OTHER PUBLICATIONS

"Client–Side JavaScript® (Web Techniques, Feb. 1997)", at www.webtechniques.com/archives/1997vander.

* cited by examiner

*Primary Examiner*—Moustafa M. Meky
(74) *Attorney, Agent, or Firm*—Gregory M. Doudnikoff

(57) ABSTRACT

A technique for permitting collaboration and coordination between the content displayed in multiple web browsers, such as the browser for a customer and the browser for a company agent. An HTTP request is sent from a customer browser to a web server via a collaboration server. The web server then sends an HTTP message responding to this request to the customer web browser via the collaboration server. At this time, the collaboration server refers to stored information, such as past history information and customer purchasing records. When the HTTP message includes data which corresponds to a predetermined condition relative to the stored information, the collaboration server embeds a program for displaying predetermined information in the HTTP message. The modified HTTP message is then sent to one of a customer browser or the browser of a collaborating agent collaborating with the customer or both, and the embedded program is executed and predetermined information is displayed. Preferably, the embedded command is in the form of a JavaScript program which is executed by the web browser, which causes the embedded information to be displayed in a separate window.

11 Claims, 5 Drawing Sheets

FIG. 3

CscHTMLRuleHndlr=/usr/lpp/ibmcf/lib/csmplhdr.so

FIG. 4

HISTORY MANAGEMENT TABLE 310

| UAI 311 | REFERENCE TO CUSTOMER PROFILE 313 | URL NAME 315 | COOKIE 317 |
|---|---|---|---|
| C0000000000000001 | CUSTOMER0000001 | 0001:/pc/notebook/new.htm<br>0002:/cgi-bin/notebook.pl&...<br>0002:/cgi-bin/cart.pl&... | 0001:/cust_id=CUSTOMER0000001;<br>0002:/cust_id=CUSTOMER0000001;<br>cust=null<br>0003:/cust_id=CUSTOMER0000001;<br>cust=newnotebook |
| C0000000000000002 | CUSTOMER0000999 | 0001:/pc/desktop/new.htm<br>0002:/cgi-bin/desktop.pl&...<br>0002L/cgi-bin/cart.pl&... | 0001:/cust_id=CUSTOMER0000999;<br>0002:/cust_id=CUSTOMER0000999;<br>cust=null<br>0003:/cust_id=CUSTOMER0000999;<br>cust=newnotebook |
| ... | ... | ... | ... |

FIG. 5

CUSTOMER PROFILE MANAGEMENT TABLE 330

| CUSTOMER ID 331 | CUSTOMER ATTRIBUTES (NAME, ADDRESS, SEX, AGE, CREDIT CARD NUMBER, ETC.) 333 | PURCHASING HISTORY (DATE, PURCHASED PRODUCT, TYPE, PRICE, ETC.) 335 | PURCHASING CHARACTERISTICS (PURCHASING PREFERENCES) 337 |
|---|---|---|---|
| CUSTOMER0000001 | | | |

FIG. 6

HELP DB
SCRIPT DB 350

| URL 351 | LINK 353 | SCRIPT FOR LINK WRITTEN IN HTML 355 | HELP FOR LINK WRITTEN IN HTML 375 |
|---|---|---|---|
| /pc/desktop/new.htm | L<br>M<br>H | L:Low_Level_Script.html<br>M:Mid_Level_Script.html<br>H:High_Level_Script.html | L:Low_Level_Help.html<br>M:Mid_Level_Help.html<br>H:High_Level_Help.html |

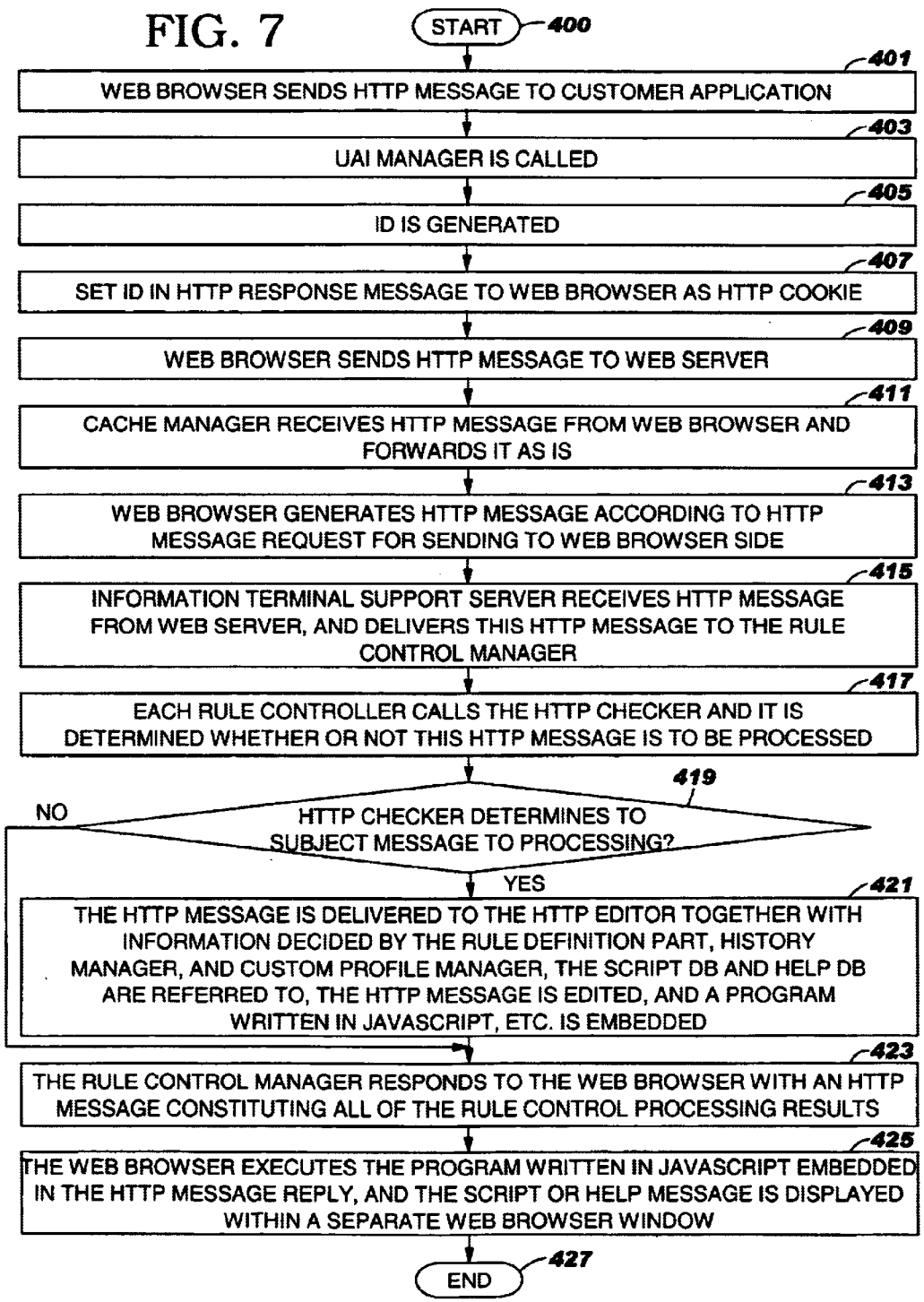

TECHNIQUE FOR PERMITTING COLLABORATION BETWEEN WEB BROWSERS AND ADDING CONTENT TO HTTP MESSAGES BOUND FOR WEB BROWSERS

BACKGROUND OF THE INVENTION

1. Field of the Invention

The present invention relates to an information processing method, and more particularly relates to a method for editing content sent from a server in response to a request from a client according to the intentions of an administrator.

2. Description of the Related Art

At the time of applying for the present invention, there is provided, as in Japanese Patent Laid-open Publication Hei. 10-124461, collaboration technology where cooperative work (reading, moving, and changing) of an HTML page can be carried out simultaneously by a number of users. FIG. 8 shows an example of this HTML page cooperative work applied to an internet banking system. A bank agent, an internet customer consultation center agent, etc., can then refer to and operate the same page as the customer by employing this technology.

However, there are also cases where, for example, an automatic help service is supplied according to context only on a customer side, information is displayed for an agent according to the circumstances, or it is wished to display specific information only on one side during collaboration.

Further, the present invention is by no means limited to collaboration. For example, effectiveness of advertising and effectiveness of teaching can be improved by providing information to a user having predetermined preferences in line with those preferences.

SUMMARY OF THE INVENTION

It is therefore an object of the present invention to provide an information terminal support system capable of providing information to a user effectively in accordance with user preferences. Another object of the present invention is to provide a collaboration system where information corresponding to net surfing conditions of one user can be supplied to another user.

A further object of the present invention is to provide a system where an administrator can intentionally change the contents of content requested by a client. Another object of the present invention is to provide a low-cost collaboration system where resources required while supporting an information terminal are reduced.

Still a further object of the present invention is to provide a collaboration system where centralized control is possible during information terminal support. Another object of the present invention is to provide a collaboration system that is not dependent on the software platform of the information terminal operated.

Another further object of the present invention is to provide a collaboration c control system capable of controlling the contents of a service provided to an information terminal without changing a server responding to a request from the information terminal.

An HTTP request is sent from a customer's web browser to a web server via an information terminal support server. The web server then sends an HTTP message responding to this request to the customer's web browser via the information terminal support server. At this time, the web server refers to information such as past reference history information and customer purchasing records and embeds a command for displaying predetermined information in the HTTP message for either the customer browser or the browser of an agent collaborating with the customer when the HTTP message corresponds with a predetermined condition.

One aspect of the present invention provides an information processing method in an a information processing system having a collaboration server which supports collaboration of a browser loaded on a customer information terminal and a browser loaded on an agent information terminal. The method comprises the steps of receiving, at the collaboration server, an HTTP message sent in response to a customer browser request, and updating reference history information; determining whether or not the reference history information agrees with a predetermined condition; inserting a program for outputting predetermined information in the HTTP message when the reference history information agrees with the predetermined condition; and sending the HTTP message with the program inserted to the customer browser or the agent browser.

In the scope of the patent claims of the specification for this application, "browser" is a concept including software such as web browsers, etc., capable of browsing information held at a place that can be accessed by an information terminal or an information processing terminal, such as a personal computer. Further, "HTTP message sent in response to a customer browser request" is a concept including both HTTP messages sent from the customer information terminal and HTTP messages sent from other servers in response to these HTTP messages.

Another aspect of the present invention provides an information processing method in an information processing system having an information terminal support server which manages user attribute information corresponding to user specification information and supports collaboration between first and second information terminals loaded with browsers and connected to a content server. The method comprises the steps of receiving, at the information terminal support server, a message sent from the content server in response to a request from the first information terminal; extracting user specification information from the request or the message; judging whether or not user attribute information corresponding to the extracted user specification information meets a predetermined condition; if so, inserting a program for displaying predetermined content data into the message; and sending a message in which the program is inserted to the information terminal.

In the scope of the patent claims in the specification of this application, "user attribute information" is a concept including all information relating to a user, such as a customer's address, age, sex, birthday, purchase record information, purchasing characteristics information and access record information, etc. Further, "user specification information" is information capable of specifying a predetermined user or a group of users, such as a (user access identification), cookie, customer ID or section ID, etc.

Yet another aspect of the present invention provides an information processing method in an information processing system having an information terminal support server which manages user attribute information corresponding to user specification information and supports an information terminal connected to a content server and loaded with a client program. The method comprises the steps of receiving, at the information terminal support server, a message sent from the content server responding to a request from the information terminal; extracting user specification information from the request or the message; judging whether or not user attribute information corresponding to the extracted user specification information meets a predetermined condition; inserting a program for outputting predetermined data into the message when the extracted user specification information meets the predetermined condition; and sending a message in which the program is inserted to the information terminal.

According to another aspect of the invention, an information terminal support server is provided which manages user attribute information corresponding to user specification information and supports collaboration between first and second information terminals loaded with browsers and connected to a content server. The information terminal support server comprises a message checker for determining whether or not user specification information extracted from a message sent from a content server in response to a request from the first information terminal meets a predetermined condition; and inserting a program for outputting predetermined data into the message when the predetermined condition is met.

Another aspect of the invention, provides computer readable code for use in an information processing system having a collaboration server which supports collaboration of a browser loaded on a customer information terminal and a browser loaded on an agent information terminal, the code comprising first code means for instructing the information terminal support server to receive an HTTP message sent in response to a customer browser request and update reference history information; second code means for instructing the information terminal support server to determine whether or not the reference history information agrees with a predetermined condition; third code means for instructing the information terminal support server to insert a program for outputting predetermined information in the HTTP message when the reference history information agrees with the predetermined condition; and fourth code means for instructing the information terminal support server to send the HTTP message with the program inserted to the customer browser or the agent browser.

Still another aspect of the present invention provides a recording medium storing an information processing program employed in an information processing system having an information terminal support server which manages user attribute information corresponding to user specification information and supports collaboration between first and second information terminals loaded with browsers and connected to a content server, the program comprising program code instructing the information terminal support server to receive, at the information terminal support server, a message sent from the content server in response to a request from the first information terminal; program code instructing the information terminal support server to extract user specification information from the request or the message; program code instructing the information terminal support server to determine whether or not user attribute information corresponding to the extracted user specification information meets a predetermined condition; program code instructing the information terminal support server to insert a program for displaying predetermined content data into the message; and program code instructing the information terminal support server to send a message in which the program is inserted to the second information terminal.

The present invention also provides a recording medium storing an information processing program employed in an information processing system having an information terminal support server which manages user attribute information corresponding to user specification information and supports an information terminal connected to a content server and loaded with a client program, the program comprising program code instructing the information terminal support server to receive, at the information terminal support server, a message sent from the content server in response to a request from the information terminal; program code instructing the information terminal support server to extract user specification information from the request or the message; program code instructing the information terminal support server to determine whether or not user attribute information corresponding to the extracted user specification information meets a predetermined condition; program code instructing the information terminal support server to insert a program for displaying predetermined content data into the message; and program code instructing the information terminal support server to send the message containing the inserted program to the information terminal.

BRIEF DESCRIPTION OF THE DRAWINGS

FIG. 3 is a conceptual view of the configuration file of the preferred embodiment of the present invention;

FIG. 4 is a conceptual view of a history management table of the preferred embodiment of the present invention;

FIG. 5 is a conceptual view of a customer profile management table of the preferred embodiment of the present invention;

FIG. 6 is a conceptual view of a help DB and a script DB of a preferred embodiment of the present invention;

FIG. 7 is a flowchart showing the operating procedure for the information terminal support system of the preferred embodiment of the present invention.

DESCRIPTION OF THE PREFERRED EMBODIMENT

A. Hardware Configuration

Figure 1:
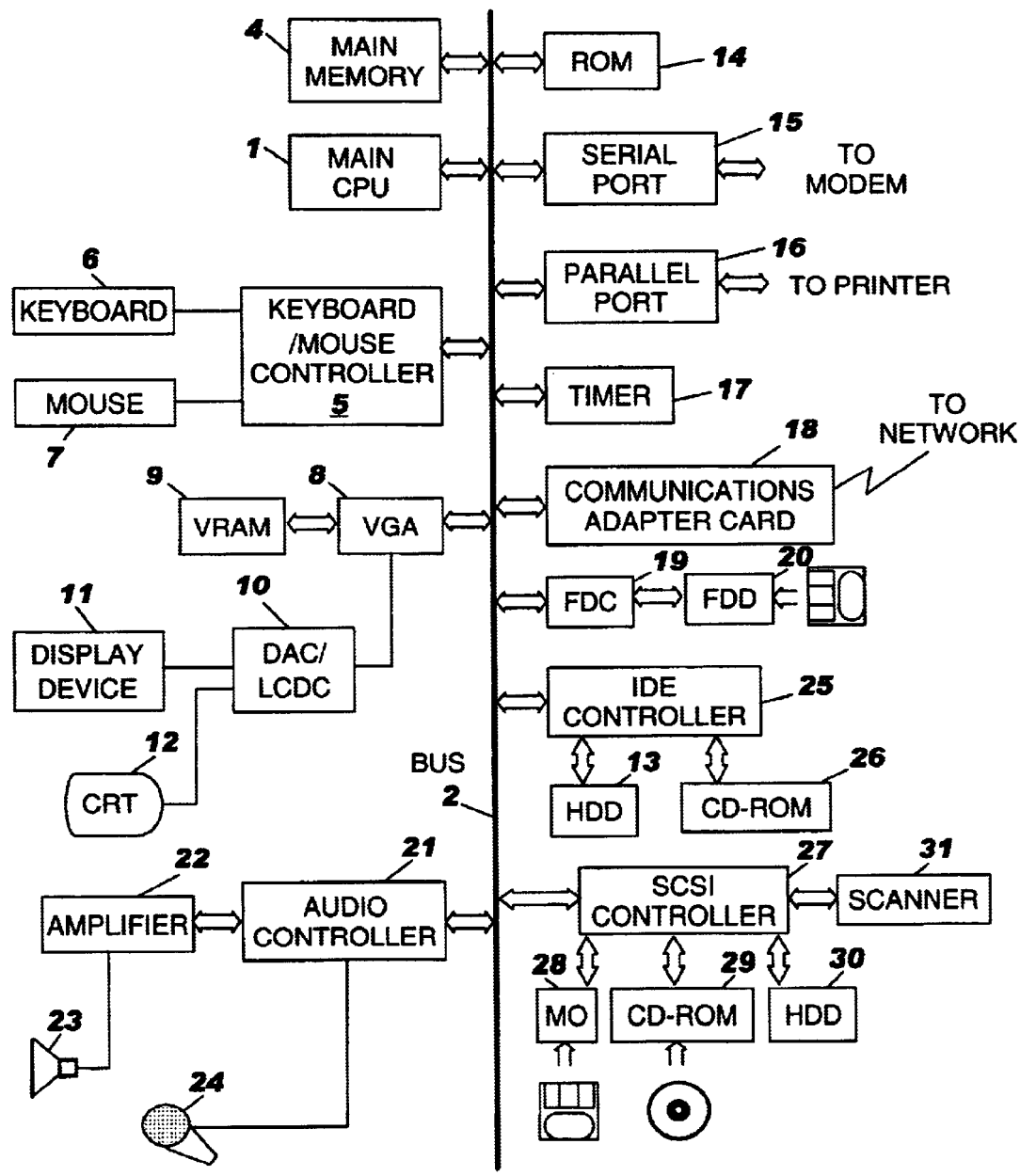
FIG. 1 is a block view showing an embodiment of an information terminal support server or information terminal hardware configuration of the present invention.
Figure 2:
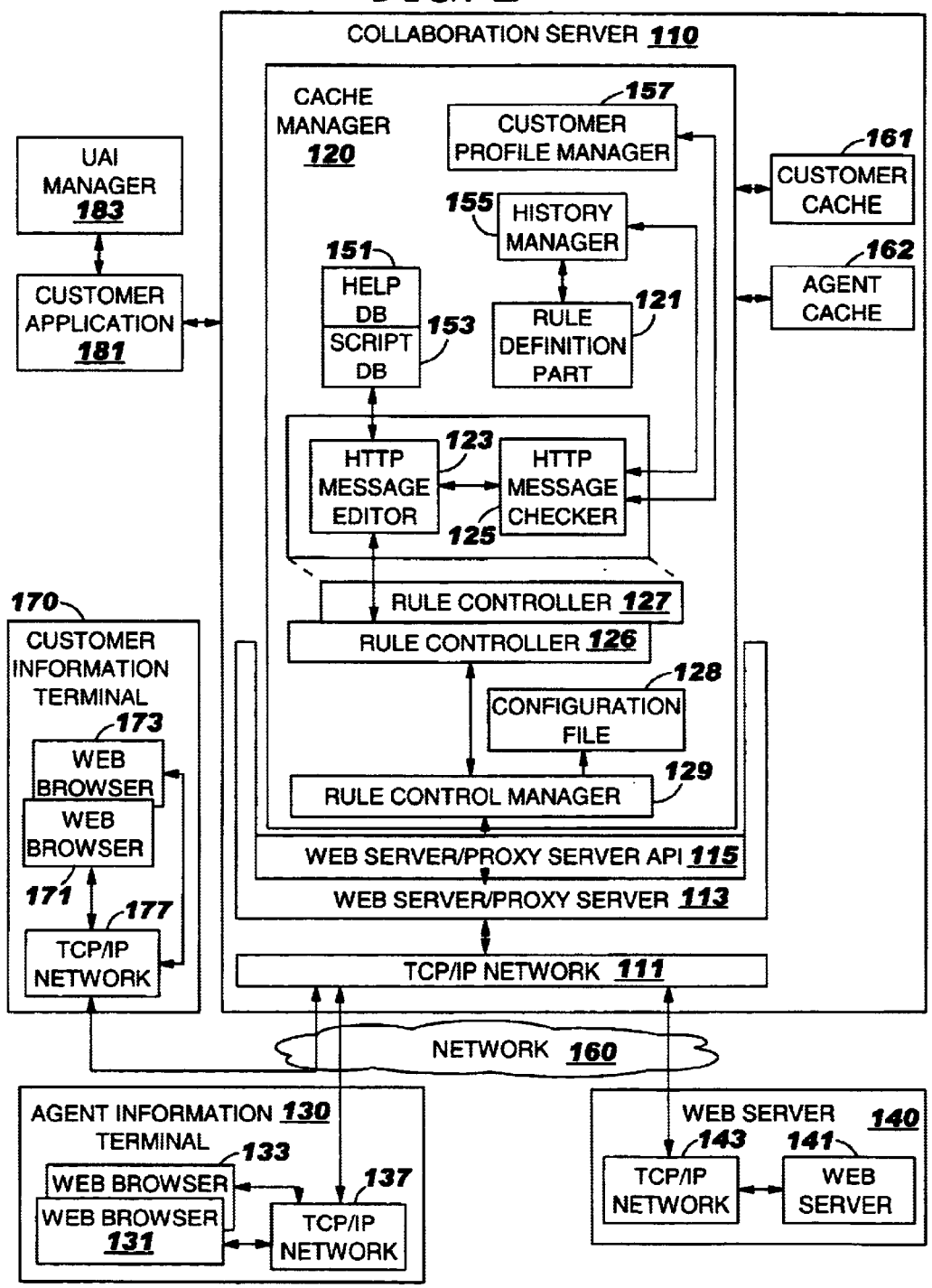
FIG. 2 is a block view of the processing elements of the preferred embodiment of the present invention.
Figure 8:
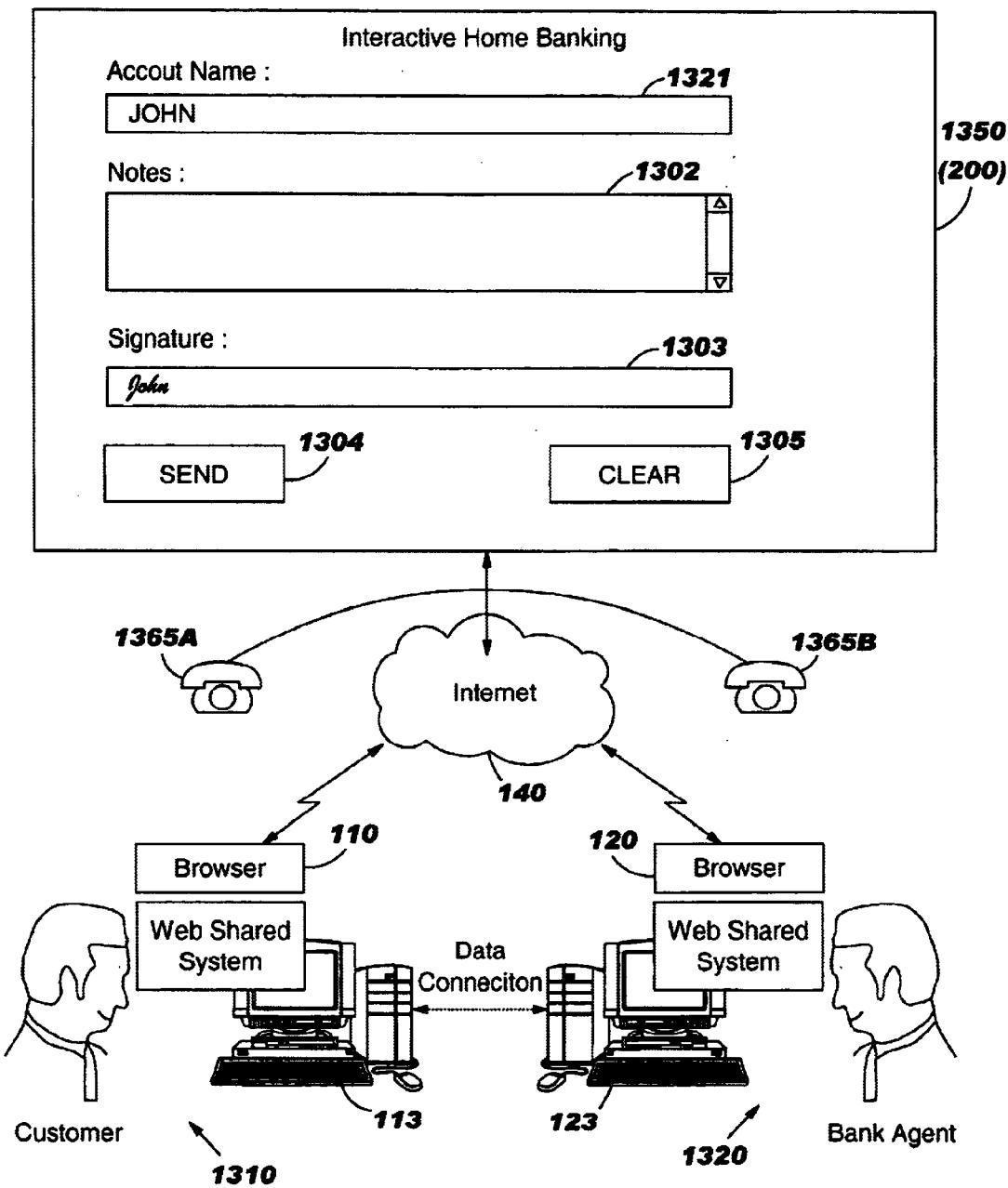
FIG. 8 is a view illustrating related collaboration technology.

FIGS. 1 and 2 show an embodiment of a hardware configuration for a collaboration server 110 used in the present invention. The collaboration server 110 includes a Central Processing Unit (CPU) 1 and main memory 4. The CPU 1 and the memory 4 are connected to an auxiliary storage device, such as a hard disc drive 13, via a bus 2. A floppy disc drive 20 (or a recording medium driver 26, 28 or 29 such as an MO or CD-ROM, etc.) is connected to the bus 2 via a floppy disc controller 19 (or IDE controller 25 or SCSI controller 27, etc.).

A floppy disc (or recording medium such as an MO or CD-ROM) is inserted into the floppy disc drive 20 (or recording medium driver such as an MO or CD-ROM, etc.). From the floppy disc in the floppy disc drive 20, the hard disc drive 13 or ROM 14 can then be loaded with code for a computer program which will implement the present invention. The code provides instructions to the CPU in unison with the operating system so as to execute the present invention. This program is loaded into the memory 4 for execution. The code for this computer program can be compressed or can be recorded and/or distributed between a plurality of mediums.

The collaboration server 110 is equipped with user interface hardware that can comprise a pointing device 7, such as a mouse, joystick, etc., or a keyboard 6 for inputting data, and a display 12 for presenting the user with visual data. The input means can also be a touch panel. It is also possible to connect a printer via a parallel port 16 or connect a modem via a serial port 15. The collaboration server 110 is connected to a network via the serial port 15 and the modem or a communications adapter card 18 (Ethernet or token ring card), etc., and is capable of communicating with other computers.

A speaker 23 receives an audio signal, D/A converted (Digital to Analog-converted) by an audio controller 21, via an amplifier 22 and outputs this signal as audio. An audio controller 21 A/D (Analog to Digital) converts audio information received from a microphone 24 so that audio information from outside the system can be taken in by the system.

It can be easily understood that the collaboration server 110 can be an information terminal having a communications function including one or a combination of a typical personal computer (PC), workstation, notebook PC, palmtop PC, or network computer, etc. Such elements of the configuration are, however, only shown as an example, and all of these elements of the configuration are not elements of the configuration essential to the present is invention.

In particular, in the hardware configuration described here, the audio controller 21, the amplifier 22, the speaker 23 and the microphone 24 required for processing audio, the keyboard 6, the mouse 7 and the keyboard/mouse controller 5 enabling direct input from an operator, the CRT 12, the display device 11, VRAM 9, and VGA 8 for presenting visual data to the user, and each of the recording medium processors 19, 25 and 27, etc. are not essential to the support of the information terminal and may be omitted.

Various modifications such as combining each of the elements of the configurations of the collaboration servers 110 and 170 over a number of machines and then executing these functions in a distributed manner can easily be assumed by one skilled in the art and such concepts are considered to be included in the spirit and scope of the present invention.

An information terminal 130 used in the present invention can also be realized, as with the collaboration servers 110 and 170, by the hardware configuration shown in FIG. 1, i.e., the information terminal 130 can also enable input of information requests and can issue and receive such requests. It can therefore be easily understood that the information terminal 130 can be realized by one or a combination of a typical personal computer (PC), a notebook PC, palmtop PC, various household products such as a television with a computer built-in, game machines having communications functions, or information terminals having communications functions including a telephone, FAX, portable telephone, Personal Handy System (PHS) or electronic notebook, etc. However, these elements of the configuration are shown as an example, and all of these elements of the configuration are by no means essential to the present invention.

The operating system associated with the collaboration server 110 is by no means limited to a specific operating system environment, and can be an operating system supporting a GUI multi-window environment as standard, such as Windows NT, Windows 9x, Windows 3.x (Windows and Windows NT are trademarks of Microsoft Corporation), OS/2, MacOS (MacOS is a trademark of Apple), Linux (Linux is a trademark of Linus Torvalds), or the X-WINDOW system (X-WINDOW is a trademark of MIT) on AIX, a character-based environment such as PC-DOS (OS/2, AIX and PC-DOS are trademarks of IBM) or MS-DOS (MS-DOS is a trademark of Microsoft), a real time OS such as VxWorks (trademark of Wind River Systems, Inc.), or an operating system such as Java OS, etc., incorporated in a network computer.

The operating system associated with the information terminals 130 and 170 is also by no means limited to a specific operating system environment, and can be an operating system supporting a GUI multi-window environment as standard, such as Windows NT, Windows 9x, Windows 3.x, OS/2, MacOS, Linux, or the X-WINDOW system on AIX, a character-based environment such as PC-DOS or MS-DOS, a real time OS such as VxWorks, or an operating system such as Java OS, etc., incorporated in a network computer.

B. System Configuration.

FIG. 2 is a functional block diagram showing a system configuration of a collaboration system including the collaboration server 110 of the preferred embodiment of the present invention.

A collaboration system 100 of the preferred embodiment of the present invention includes information terminals 130 and 170, a collaboration server 110 and a web server 140.

In the preferred embodiment of the present invention, web browsers 131 and 173 are installed on the information terminals 130 and 170. The web browsers 131 and 173 designate a URL and send a request to go to a predetermined web server, such as the webserver 140. The web browsers 131 and 173 then receive a response sent from the web server 140 for displaying on each display screen. A client collaboration program 135 can be installed on the agent information terminal 130 and the customer information terminal 170. The client program 135 brings about web-based collaboration by monitoring and controlling the operation of the web browsers 131, 171. The collaboration program described in Japanese Patent Laid-open Publication Hei. 10-124461 can be used as the client collaboration program.

The collaboration server 110 of the preferred embodiment of the present invention is equipped with a web server/proxy server 113, a web server/proxy server API 115, a cache manager 120, customer cache 161, agent cache 162, a user access identification manager 183 and a customer application 181.

The cache manager 120 caches HTML contents (HTTP responses) for HTTP requests sent by the web browsers 131 and 173. When the two web browsers are shared, the cache manager 120 controls returning of the same HTML data in accordance with HTTP requests sent in an interactive manner. In the preferred embodiment of the present invention, the cache manager 120 is written using the web server/proxy server 113 or web server/proxy server API 115 so that all HTTP messages can be monitored using the proxy server or web server 113. HTTP messages handled and monitored by a rule control manager 129 are sent to the rule control manager 129, which is entrusted with the processing of these HTTP messages.

The rule control manager 129 delivers HTTP messages sent from the web server/proxy server 113 to rule controllers 126 and 127 designated by a configuration file 128 and is entrusted with the processing of these HTTP messages. The rule control manager 129 can designate a plurality of configuration files 128 and can call the rule controllers 126 and 127 in a designated order. A plurality of rule controllers can be designated at the configuration file 128 using the format shown in FIG. 3.

The rule controllers 126 and 127 comprise a HTTP message checker 125 and a HTTP message editor 123. The HTTP message checker 125 refers to a rule definition part 121 and determines whether or not to edit an HTTP message. When it is determined to edit a message, this HTTP message is sent to the HTTP message editor 123. The HTTP message editor 123 then edits the HTTP message according to the contents of the rule definition part 121, stores the edited message in the agent cache 162, and the results of editing are returned to the rule control manager 129. When it is determined not to edit a message, this message is returned to the rule control manager 129 as is.

The HTTP checker 125 can discriminate between an HTTP message from the customer information terminal 170 and an HTTP message from the agent information terminal 130 because the UAI included in the agent HTTP message shows an agent-specific value.

In the preferred embodiment of the present invention, the rule controllers 126 and 127 themselves are in the form of a Shared Object (in Unix) or a Dynamic Link Library (in Windows). The programming interface is decided as follows.

TABLE 1

```
int CscPluginCInit(const char *pszConf)
This function is called when CacheManager is started via CscPlhdrInit ( ).
argument
     const char    *          :path of HTML plugin configuration file
return value
     0                        :OK
     4900–4999:error
int CscPluginCConv ( const CsmConvParam param,
     const char    *pIn,
     const int     isize,
     char          **ppOut,
     int           *osize )
This function is called to convert an HTML content via CscPlhdrConv0.
argument
const CsmConvParam     :information for conversion
const char *pIn        :input content
const int isize        :size of input content
char    ** ppOut       :output content
int    *osize          :size of output content
return value
     0  :OK
     4900–4999 : error
void CsmPluginCFree ( char *p)
This function is called to free ppOut of CscPluginCConv( ) via
CscPlhdrFree0.
argument
     char *                   :ppOut of CscPluginCConv( )
return value
     None
int CscPluginCTerminate ( )
This function is called when CacheManager is stopped via
CscPlhdrdrTeminate ( ).
argument
     None
return value
     0                        :OK
     4900–4999 : error
```

The rule definition part 121 comprises a condition setting part and a command setting part, and defines under what conditions and in what manner HTTP messages are to be edited. In the preferred embodiment of the present invention, the manner in which information held by a history manager 155 and a customer profile manager 157 is employed is defined by the rule definition part 121. Basically, this portion is written as part of the application (Shared Object or Dynamic Link Library), and is registered by being specified in the configuration file in the HTTP check as the following format.

TABLE 2

CscRuleController=<modulename>

The history manager 155 manages web pages visited by web browsers used by users and the order of the information for these web pages for each user. In the preferred embodiment of the present invention, user identification is carried out by setting a specific unique HTTP cookie.

The history manager 155 is registered with respect to the rule definition part 121 by being specified in the configuration file in the following format.

TABLE 3

CscRuleCtrhistoryMgmt=<modulename>

The HTTP message checker 125 for the rule controllers 126 and 127 compares a condition part of the rule definition part 121 and HTTP messages sent by the web browsers 131, 133, 171 and 173 and determines whether or not there is agreement with a predetermined condition. However, if a condition referencing the history manager 155 exists in the condition part, the HTTP message checker 125 decides to acquire history manager information. When, for example, the rule definition part is set as follows, when the same URL appears three to five times in the history, a program displaying a RANK=L help message is inserted into the HTTP messages for the customer web browsers 171, 173 and a program displaying script is inserted into each of the HTTP messages for the agent web browser 131. Similarly, a program displaying a RANK=M helper is inserted in the HTTP messages for the customer web browser 171 when the same URL appears in the history six to eight times, and a program displaying a RANK=H helper is inserted in the HTTP messages for the customer web browser 171 when the same URL appears nine times or more.

TABLE 4

3<=same_url_occurrence && same_url_occurrence<= 5 : customer_rank=L; customer_action=help : agent_action=script
6<= same_url_occurrence && same_url_occurrence<= 8 : customer_rank=M; customer_action=help : agent_action=script
9<=same_url_occurrence : customer_rank=H; customer_action=help : agent_action=script FIG. 4 shows a history management table 310 for managing the history manager 155 of the preferred embodiment of the present invention. The history management table 310 of the present invention manages a UAI 311, reference information 313 of the customer profile, a URL name 315, and information for a cookie 317. Which page is being viewed in the current session can then be determined based on this data. When, for example, the same page is viewed repeatedly, it can be assumed that the user cannot find what they are looking for, and can therefore be determined that the user is intending to display a search page. The history management table 310 can then be updated by the rule control manager 129 or by another element of the configuration capable of monitoring an HTTP message.

The customer profile manager 157 analyzes the past history and preferences of the user. The customer profile manager 157 is registered with respect to the rule definition part 121 by being specified in the configuration file in the following format.

TABLE 5

CscRuleCtrlCustProfileMgmt=<modulename>

The HTTP message checker 125 for the rule controllers 126 and 127 compares a condition part of the rule definition part 121 and HTTP messages sent by the web browsers 131, 133, 171 and 173 and determines whether or not there is agreement with a predetermined condition. However, if a condition referencing the customer profile manager 157 exists in the condition part, the HTTP message checker 125 decides to acquire information of the customer profile manager 157. When, for example, the rule definition part is set as follows, Customer$_{13}$ rank=H is set for customers where Loyalty is high and Tendancy is high, and an action section is designated so that a help message is displayed on the customer information terminal 170 and a script is displayed via the web browser 131 at the agent information terminal 130. Further, Customer$_{13}$ rank=H is set for customers where loyalty is intermediate and Tendancy is high, and an action is designated so that a help message is displayed on the customer information terminal 170 and no special script is displayed at the agent information terminal 130. The meaning of Tendancy=high is that past purchasing history shows that the customer has a strong inclination to buy expensive goods.

loyalty=high && tendancy=high: customer_rank=H; customer$_{13}$ action=help; agent$_{13}$ action=script loyalty=medium && tendancy=high: customer_rank=H; customer_action=help FIG. 5 is a customer profile management table 330 for managing the customer profile manager 157 of the preferred embodiment of the present invention. The customer profile management table 330 of the preferred embodiment of the present invention manages a customer ID 331, customer attribute information 333, purchasing history information 335, and purchasing characteristics information 337.

Specifically, personal information such as the name, age and address, etc., of the customer and records of past collaboration, etc., are stored as customer attribute information 333, goods purchased in the past and the number of such goods purchased are stored as purchasing history information 335, and customer purchasing characteristics extracted from the purchasing history, etc., using well known data mining techniques are stored as purchasing characteristics information 337. In the preferred embodiment of the present invention, this information is periodically updated. The rule definition part 121 derives the customer purchasing history and preferences based on this data and can decide what kind of scripts and help messages are to be displayed.

A help database (DB) 151 and a script DB 153 are databases for managing HTML contents and JavaScript commands inserted into HTTP messages returned to the web browsers.

FIG. 6 is an outline view of the help DB 151 and the script DB 153 of the preferred embodiment of the present invention. The help DB 151 and the script DB 153 manage scripts and help HTMLs for each of the URLs according to rank. In the preferred embodiment of the present invention, information for the URL 351, rank 353, script 355 written in HTML for the rank, and help 357 written in HTML for the rank is managed.

The HTTP message editor 123 specifies the script or help HTML to be displayed by referring to the help DB 151 and the script DB 153 based on the HTTP message delivered by 15 the HTTP message checker 125 and the rank and inserts the following program written in JavaScript into the HTTP message.

function openScript(url) {
  window.open (url, "help_window");
}
<body onLoad="openScript (\"High_Level_Script.html\")">
</body>

The HTTP message editor 123 can also edit HTML so that predetermined information that was to be outputted in a separate window can be incorporated and outputted within a single window. When it is decided to carry out HTTP editing, the HTTP checker 125 delivers the HTTP message and classification for a script or a help message to the HTTP editor 123 and also entrusts processing of the HTTP messages to the HTTP editor 123.

The UAI manager 183 manages a customer application 181 which allots unique IDs to each browser. This customer application 181 receives a unique ID by calling the UAI manager 183 and installs this unique ID as a cookie in the HTTP message to be returned to the web browser.

Each functional block shown in FIG. 2 is described above but these functional blocks are logical functional blocks. This does not necessarily mean that these functional blocks each have to be individually realized by hardware and software, and the functional blocks may be realized by combinations of hardware and software or by shared hardware and software. It also goes without saying that all of the functional blocks shown in FIG. 2 are not essential elements of the configuration of the present invention.

C. Operating Procedure

FIG. 7 is a flowchart showing the operation of the information processing terminal support system 100 of the preferred embodiment of the present invention. This procedure starts from Step 400. First, the web browser 131 sends an HTTP message to the customer application 181 (Step 401). When an HTTP message is received, the customer application 181 calls the UAI manager 183 (Step 403). In response, the UAI manager 183 generates a unique ID and replies to the customer application 181 (Step 405). When this ID is received, the customer application 181 installs this ID as an HTTP cookie in the HTTP message sent back to web browser 131 (Step 407). The web browser 131 then sends an HTTP message to the web server 140 via the collaboration server 110 in order to acquire certain HTML content (Step 409).

A cache manager 120, which is written as a server program-specific API on the collaboration server 110, receives the HTTP message from the web browser 131, and the HTTP message is then transferred, as is, to the web server 140. The processing of the HTTP message is entrusted to the web server 140 (Step 411). The web server 140 generates an HTTP message in response to the HTTP message request and sends the responding HTTP message back across the network 160 to the web browser side of the network, and more specifically to the collaboration-server 110 (Step 413).

When the collaboration server 110 receives the HTTP message from the web server 140, this HTTP message is delivered to the rule control manager 129 (Step 415). The received HTTP message is then stored in the customer cache 161 and the agent cache 163. The rule control manager 129 then calls the rule controllers 126 and 127 in the defined order and entrusts processing of the HTTP message to the rule controllers.

Each rule controller 126 and 127 first calls the HTTP checker 125, and it is determined whether or not this HTTP message is to be processed (Step 419). Information in the rule definition part 121, history manager 155, and customer profile manager 157 is employed in making this determination at this time.

If it is determined that the HTTP message is to be processed by the HTTP checker 125, the HTTP message is delivered to the HTTP editor 123 together with information determined by the "rule definitions", "history manager" and "custom profile manager". The script DB 153 and help DB 151 are then referred to and the HTTP message is edited to include information from the script DB 153 and/or the help DB 151. The HTTP message is edited in such a manner that a script and help message are displayed in a separate window when the web browser has received and processed this HTTP message. In practice, the embedded information may be in the form of a program written in JavaScript which is embedded in the HTTP message (Step 421) and which will be executed by the receiving web browser.

The rule control manager 129 then sends the HTTP message that is the result of all the rule control processing back to the web browser 131 and possibly the agent web browser 171 if collaboration is desired so that the information can be displayed on both terminals 130, 170. (Step 423). There can therefore be a situation where there is no program embedded in the message sent to either the agent or the customer, where one of either the agent or the customer does not have a program embedded in the message sent thereto, or where both the agent and the customer receive a message having a program embedded in the HTTP message.

The web browser 131 and/or 171 then receives the HTTP message. If included, the web browser 131 and/or 171 then executes the embedded program (which is preferably written in JavaScript and is embedded in the returned HTTP message). Execution causes a script and/or a help message to be displayed at the receiving terminal 130 and/or 170, preferably within a separate web browser window (Step 425).

D. Other

A description is provided above of an example of the present invention applied to collaboration technology. However, in the present invention, an HTTP message sent from the web server 140 is monitored, and when reference history information of this HTTP message is determined by the collaboration server 110 to meet a predetermined condition, this message is edited before being sent to the web browser(s). This technology can therefore also be applied to fields other than collaboration, such as internet education, where, for example, a correct answer field may be displayed upon agreement with a predetermined condition. Further, in the preferred embodiment of the present invention, an example of an internet/intranet is described, but this technology can also be applied to communication systems employing protocols other than the internet protocol. As described above, according to the present invention, additional information can be provided to a user in an effective manner in accordance with user preferences. In an aspect of the present invention, information designed by an administrator can be provided to a client or a further client when client operation history agrees with a predetermined condition.

What is claimed is:

1. An information processing method in an information processing system having a collaboration server which supports collaboration between a first browser loaded on a fifrst computer and a second browser loaded on a second computer, the collaboration server, first computer and second computer being operatively connected by a network, said method comprising the steps of:

(a) receiving, at the collaboration server, an HTTP message sent in response to a browser request from the first browser, and updating reference history information;

(b) determining whether or not the reference history information agrees with a predetermined condition;

(c) inserting a program for outputting predetermined information in the HTTP message when the reference history information agrees with the predetermined condition; and (d) sending the HTTP message with the inserted program to one of the first browser or the second browser.

2. An information processing method in an information processing system having a support server which manages user attribute information corresponding to user specification information and supports collaboration between first and second computers loaded with browsers and connected to a content server, the support server, first computer and second computer being connected by a network, said method comprising the steps of:

(a) receiving, at the support server, a message sent from the content server in response to a request from the first computer;

(b) extracting user specification information from the request or the message;

(c) determining whether or not user attribute information corresponding to the extracted user specification information meets a predetermined condition;

(d) if it is determined that the predetermined condition has been met, modifying the message by inserting a program for displaying predetermined content data into the message; and (e) sending the modified message to the first computer.

3. In a networked computing environment, an information processing method in an information processing system having a support server which manages user attribute information corresponding to user specification information and supports an information terminal connected to a content server and loaded with a client program, said method comprising the steps of:

(a) receiving, at the support server, a message sent from the content server in response to a request from the information terminal;

(b) extracting user specification information from the request or the message;

(c) determining whether or not user attribute information corresponding to the extracted user specification information meets a predetermined condition;

(d) modifying the message by inserting a program for outputting predetermined data into the message when the extracted user specification information meets the predetermined condition; and (e) sending the modified message in which the program is inserted to the information terminal.

4. An information terminal support server which manages user attribute information corresponding to user specification information and supports collaboration between first and second information terminals loaded with browsers and connected to a content server, the information terminal support server, content server, first information terminal and second information terminal being connected via a network, said information terminal support server comprising:

(a) a message checker for determining whether or not user specification information extracted from a message sent from a content server in response to a request from the first information terminal meets a predetermined condition; and (b) an HTTP editor for inserting a program for outputting predetermined data into the message when the predetermined condition is met.

5. Computer readable code for use in an information processing system having a collaboration server which supports collaboration between a first browser loaded on a first information terminal and a second browser loaded on a second information terminal, the collaboration server, first information terminal and second information terminal being connected by a network, said computer readable code comprising:

(a) first code means for causing the collaboration server to receive an HTTP message sent in response to a request from the first browser and update reference history information;

(b) second code means for determining whether or not the reference history information meets a predetermined condition;

(c) third code means for causing the collaboration server to insert a program for outputting predetermined information in the HTTP message when the reference history information meets the predetermined condition; and (d) fourth code means for sending the HTTP message with the inserted program to the first browser or the second browser.

6. Computer readable code according to claim 5, wherein the first information terminal is a customer computer, and the reference history information is customer information.

7. Computer readable code according to claim 5, wherein the predetermined information is customer help information retrieved from a help database.

8. Computer readable code for use in an information processing system having an information terminal support server which manages user attribute information corresponding to user specification information and supports collaboration between first and second information terminals loaded with browsers and connected to a content server the information terminal support server, first information terminal, second information terminal and content server being connected by a network, said computer readable code comprising:

(a) first code means for causing the information terminal support server to receive a message sent from the content server in response to a request from the first information terminal;

(b) second code means for extracting user specification information from the request or the message;

(c) third code means for determining whether or not user attribute information corresponding to the extracted user specification information meets a predetermined condition;

(d) fourth code means for inserting a program for displaying predetermined content data into the message; and (e) fifth code means for sending a message in which the program is inserted to the second information terminal.

9. Computer readable code for use in an information processing system having an information terminal support server which manages user attribute information corresponding to user specification information and supports an information terminal connected to a content server and loaded with a client program, said code comprising:

(a) first code means for causing the information terminal support server to receive a message sent from the content server in response to a request from the information terminal;

(b) second code means for extracting user specification information from the request or the message;

(c) third code means for determining whether or not the extracted user specification information meets a predetermined condition;

(d) fourth code means for inserting a program for displaying predetermined content data into the message; and (e) fifth code means for sending the message containing the inserted program to the information terminal.

10. Computer readable code according to claim 9, wherein the information terminal support server extracts the user specification information.

11. Computer readable code according to claim 9, wherein the inserted program is a JavaScript program which is executed by a browser loaded on the information terminal and displayed in a separate window.

* * * * *